(12) United States Patent
Cheng et al.

(10) Patent No.: US 11,649,689 B1
(45) Date of Patent: May 16, 2023

(54) SEQUENTIAL RETRIEVAL MECHANISM FOR BI-DIRECTIONAL WELLHEAD ANNULUS PACKOFF

(71) Applicant: Baker Hughes Oilfield Operations LLC, Houston, TX (US)

(72) Inventors: Samuel Cheng, Houston, TX (US); Prashant Patel, Tomball, TX (US); Xichang Zhang, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/523,714

(22) Filed: Nov. 10, 2021

(51) Int. Cl.
*E21B 33/04* (2006.01)
*F16J 15/18* (2006.01)

(52) U.S. Cl.
CPC ............ *E21B 33/04* (2013.01); *F16J 15/189* (2013.01); *E21B 2200/01* (2020.05)

(58) Field of Classification Search
CPC ................................ E21B 33/04; F16J 15/189
See application file for complete search history.

(56) References Cited

U.S. PATENT DOCUMENTS

| | | | |
|---|---|---|---|
| 4,131,287 A * | 12/1978 | Gunderson | ............ F16J 15/185 277/328 |
| 4,781,387 A | 11/1988 | Braugh | |
| 7,234,527 B2 | 6/2007 | Nivens | |
| 8,146,670 B2 | 4/2012 | Ellis | |
| 8,500,127 B2 | 8/2013 | Gette | |
| 9,341,039 B2 | 5/2016 | Galle | |
| 9,388,655 B2 * | 7/2016 | Sommerfeld | ........... E21B 33/03 |
| 9,939,089 B2 | 4/2018 | Baca | |
| 9,982,502 B2 | 5/2018 | Nelson | |
| 2010/0126736 A1 | 5/2010 | Ellis | |
| 2015/0068725 A1 | 3/2015 | Duong | |

FOREIGN PATENT DOCUMENTS

| | | |
|---|---|---|
| CN | 103452517 | 12/2013 |
| CN | 112377138 | 2/2021 |
| WO | 2014/105391 | 7/2014 |

OTHER PUBLICATIONS

Dril-Quip, Inc., "Subsea Wellhead Systems," 2015, 28 pages.
International Search Report and Written Opinion dated Mar. 2, 2023 in corresponding PCT Application No. PCT/US2022/079826.

* cited by examiner

*Primary Examiner* — Jonathan Malikasim
(74) *Attorney, Agent, or Firm* — Hogan Lovells US LLP

(57) ABSTRACT

A wellhead annulus packoff and an associated method is disclosed. A retainer lock mechanism of the wellhead annulus packoff is to sit at least partly within a first indentation of a hanger. The retainer lock mechanism includes a bottom surface and a side surface so that the bottom surface is to be associated with a lower energizing ring and the side surface is to be engaged in an energized state with a first side of the seal element. A second side of the seal element is to abut with a surface of a housing and a slot of the seal element is to abut with the lower energizing ring in the energized state of the wellhead annulus packoff.

20 Claims, 10 Drawing Sheets

US 11,649,689 B1

SEQUENTIAL RETRIEVAL MECHANISM FOR BI-DIRECTIONAL WELLHEAD ANNULUS PACKOFF

BACKGROUND

1. Field of Invention

This disclosure relates generally to oilfield equipment and more particularly to a sequential retrieval mechanism for a bi-directional wellhead annulus packoff and an associated method.

2. Description of the Prior Art

In multi-stage seals used in wellhead annulus packoffs, there may be a risk that a lowest seal, such as a lower energizing ring, may be retrieved in an energized position. Removal of a seal while it is in an energizing position increases retrieval loads and can lead to issues in the field. Such issues may be exacerbated when recessed seal pockets are in a wellhead housing. For example, a lead in and an exit may include tapers to a pocket, and such features can create a wedge pinch point if an energized seal is retrieved. Such a pinch point may prevent part of a multi-stage seals, such as a lowest seal, from being recovered entirely. More pulling or de-energizing force may be required, but may also result in more radial squeeze, through the tapers forming a tapered interface.

SUMMARY

In at least one embodiment, a method to be used for a wellhead annulus packoff is disclosed. The method includes providing a retainer lock mechanism for the wellhead annulus packoff. The retainer lock mechanism sits at least partly within a first indentation of a hanger. The method includes associating the retainer lock mechanism with a lifting surface of a lower energizing ring. A further step or process of the method includes associating a seal element with the retainer lock mechanism so that a first side of the seal element is to hold the retainer lock mechanism in position, a second side of the seal element is to abut with surface of a housing, and a slot of the seal element is to abut with the lower energizing ring in an energized state of the wellhead annulus packoff.

In at least one embodiment, a wellhead annulus packoff is disclosed. The wellhead annulus packoff includes a retainer lock mechanism to sit at least partly within a first indentation of a hanger. The retainer lock mechanism is to include a bottom surface and a side surface so that the bottom surface is associated with a lower energizing ring and the side surface is engaged in an energized state with a first side of the seal element. A second side of the seal element is to abut with a housing and a slot of the seal element is to abut with the lower energizing ring in the energized state of the wellhead annulus packoff.

BRIEF DESCRIPTION OF THE DRAWINGS

Various embodiments in accordance with the present disclosure will be described with reference to the drawings, in which.

DETAILED DESCRIPTION

Figure 1:
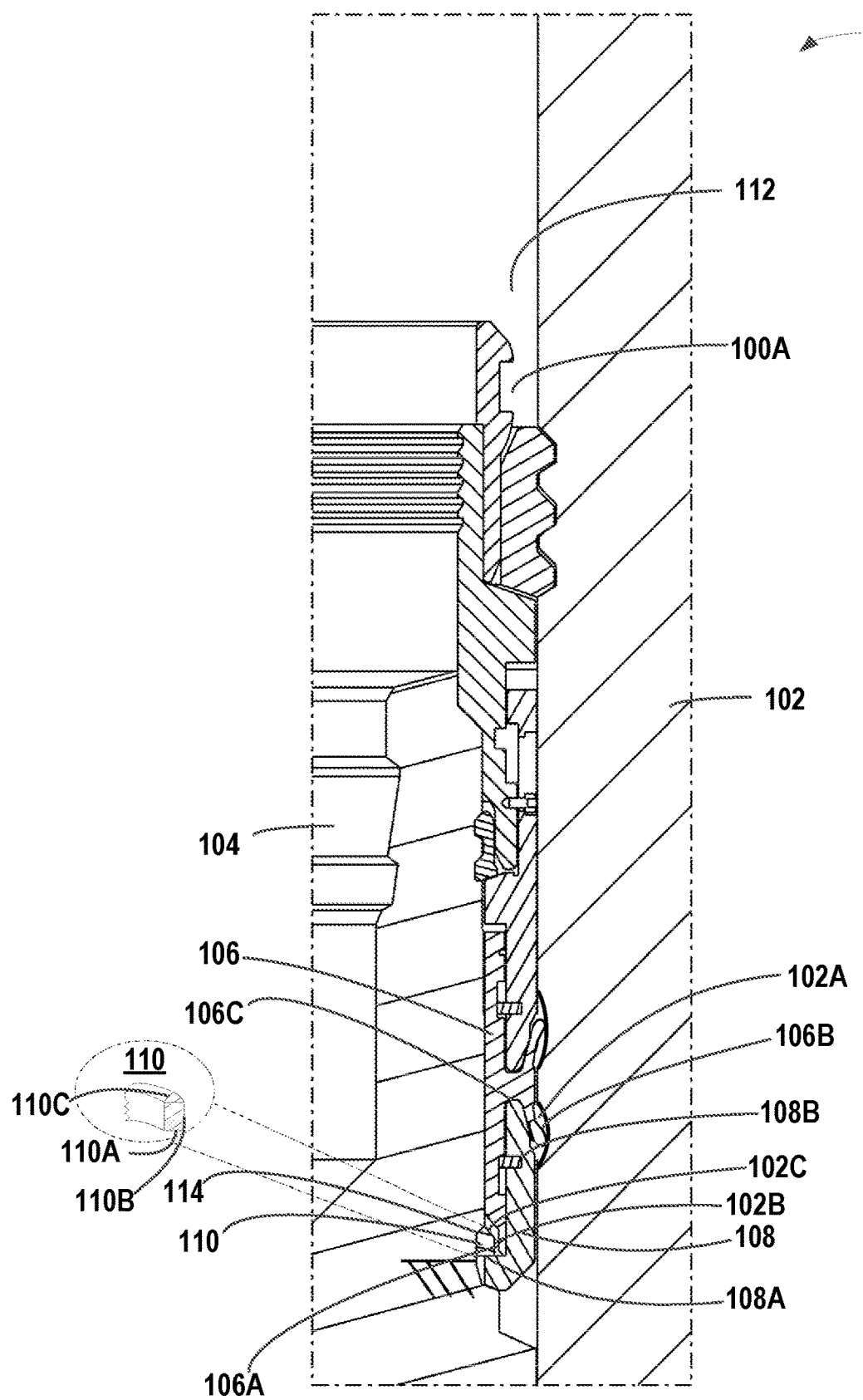
FIG. 1 illustrates a cross-sectional view of a wellhead annulus packoff in an energized state, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various other functions can be implemented within the various embodiments as well as discussed and suggested elsewhere herein. In at least an aspect, the present disclosure is to a system and a method for a wellhead annulus packoff, in accordance with at least one embodiment.

In at least one embodiment, such a method and system supports sequential retrieving of a wellhead annulus packoff that is in the form of a multi-stage metal to metal (MS) seal. As such, references are interchangeably made herein of a wellhead annulus packoff, a multi-stage seal, or an MS seal. The wellhead annulus packoff is retrieved from a wellbore, between a hanger and a wellhead housing, by use of an isolation mechanism. The isolation or retainer lock mechanism may be a retainer lock ring that anchors a lowest seal component, such as a lowest energizing ring, in place. This prevents the lowest energized seal component of the wellhead annulus packoff from being retrieved in its energized state or position. Such a feature improves a retrieval reliability, minimizes damage to the seal pockets, and reduces a retrieval force required to retrieve the wellhead annulus packoff.

In at least one embodiment, a retainer lock mechanism may be used with any retention feature, such as with a lock ring, collet fingers arrangement, locking dogs, or snap fit fingers that can be used to hold a lowest energized seal component of the multi-stage MS seal to a hanger. This is so that retrieval loads applied to a top of the seal are sufficient to cause the seal to de-energize prior to releasing the retainer lock mechanism from the hanger and the wellhead annulus packoff from the wellhead annulus. The MS seal can therefore be retrieved after seal components, including the lowest seal part, have been relaxed.

The isolation or retainer lock mechanism herein may be used in a bi-directional wellhead annulus packoff, such as in a multi-stage MS seal, to allow the seal to be relaxed prior to removal. In at least one embodiment, the method herein enables removal of a multi-stage MS seal with a first de-energizing force or forces that is less than a second de-energizing force or forces, where the second de-energizing force or forces would otherwise be required to remove a similar wellhead annulus packoff that is devoid of the isolation or retention mechanism. In at least one embodiment, energizing is in reference to any of the seal components of a wellhead annulus packoff under an energizing force to be in an energized state and de-energizing is in reference to any of the seal components of the wellhead annulus packoff under a de-energizing force to be removed from the energized state or to be in a de-energized state.

In at least one embodiment, therefore, the wellhead annulus packoff herein has a retainer lock mechanism that is associated with a lowest seal component of a multi-stage MS seal forming the wellhead annulus packoff. The wellhead annulus packoff is located between the wellhead hanger and housing, during a setting stroke. The retainer lock mechanism anchors the lower seal part of the multi-stage MS seal, so that retrieval loads applied to the top of the multi-stage seal cause the multi-stage seal to de-energize prior to releasing the retention feature.

In at least one embodiment, the wellhead annulus packoff herein has a positive retention using the retainer lock mechanism so that the positive retention enables a conditional or binary operator for the retainer lock mechanism. The conditional or binary operator of the retainer lock mechanism is such that the retainer lock mechanism is to be in an engaged position between the hanger, a seal element, and a lower energizing ring, when the wellhead annulus packoff in an energized state; and is to be in a disengaged position with the wellhead annulus packoff in a de-energized state.

The conditional or binary operator may be referenced by an MS seal stroke length so that the positive retention is provided for the lowest seal part till de-energizing results in the retention mechanism disengaging from the hanger. Further, a secondary effect is that the retention mechanism using the retainer lock mechanism and subsequent seal components prevents the multi-stage MS seal from moving up under pressure from below. This secondary effect maintains stability of the multi-stage MS seal, and therefore enhances seal performance under pressure from below.

FIG. 1 illustrates a cross-sectional view 100 of a wellhead annulus packoff 100A in an energized state, in accordance with at least one embodiment. The wellhead annulus packoff 100A may include multi-stage seal components that are landed and energized within an annular space 112 of a hanger 104 and a housing 102. For example, a retainer lock mechanism, such as a retainer lock mechanism 110, can sit at least partly within a first indentation 114 of the hanger 104. The retainer lock mechanism 110 can include a bottom surface 110A and a side surface 110B.

The bottom surface 110A of the retainer lock mechanism 110 can be associated with a lower energizing ring 108. The bottom surface 110A abuts a lifting surface 108A of the lower energizing ring 108. The bottom surface 110A and the side surface 110B of the retainer lock mechanism 110 can limit a top surface 108B of the lower energizing ring 108 or the second side 106B of the seal element 106 from asserting pressure against the housing 102 during de-energizing of the wellhead annulus packoff 100A.

The side surface 110B of the retainer lock mechanism 110 can be engaged in an energized state with a first side 106A of a seal element 106. A second side 106B of the seal element 106 abuts at least one second indentation or recess 102A of a housing 102. In at least one embodiment, the second indentation or recess 102A is a recessed seal pocket in the housing in which legs of a seal element 106 may be fully engaged. The retainer lock mechanism has at least one inclined top surface 110C that can allow the retainer lock mechanism to slip out of the first indentation 114 of the hanger during de-energizing of the wellhead annulus packoff.

The top surface 110C is a primary reaction surface that anchors the multi-stage MS seal to the hanger 104. In at least one embodiment, the top surface 110C is an interface that transfers a vertical retrieval force, from the lower energizing ring 108, to the bottom surface 110A; allows the retainer lock mechanism to be engaged within the first indentation 114 of the hanger during energizing of the wellhead annulus packoff; and transfers pressure from below the multi-stage MS seal into a neck of the hanger 104.

Further, a slot, generally referenced by reference numeral 106C, of the seal element 106 abuts the lower energizing ring 108 in the energized state. In at least one embodiment, even though spacing is illustrated between the retainer lock mechanism 110 and the first side 106A of a seal element 106, such spacing may not exist as the seal element 106 is energized between the retainer lock mechanism 110 and the lower energizing ring 108. Instead, the seal element 106 is abutting the retainer lock mechanism 110 on one side and the lower energizing ring 108 on another side.

In at least one embodiment, the inclined top surface 110C of the retainer lock mechanism can enable one of: an allowance for the retainer lock mechanism to slip out of the first indentation of the hanger during de-energizing of the wellhead annulus packoff or a transfer of a vertical upwards force from the lower energizing ring into a neck of the hanger in an energized state of the wellhead annulus packoff. The retainer lock mechanism can maintain a vertical elevation of lower energizing ring within an annular space having the wellhead annulus packoff. Such maintenance is beneficial for removal of the wellhead annulus packoff without requirements for additional de-energizing force. Further, the vertical upwards force may be a pressure end-load from a pressure from below or a reaction force from a retrieval force applied during de-energizing of the wellhead annulus packoff. As the seal element moves vertically during de-energizing, leg of the seal element are forced to retract and to prevent from pinching against the housing, prior to releasing the lower seal energizing ring.

Figure 2:
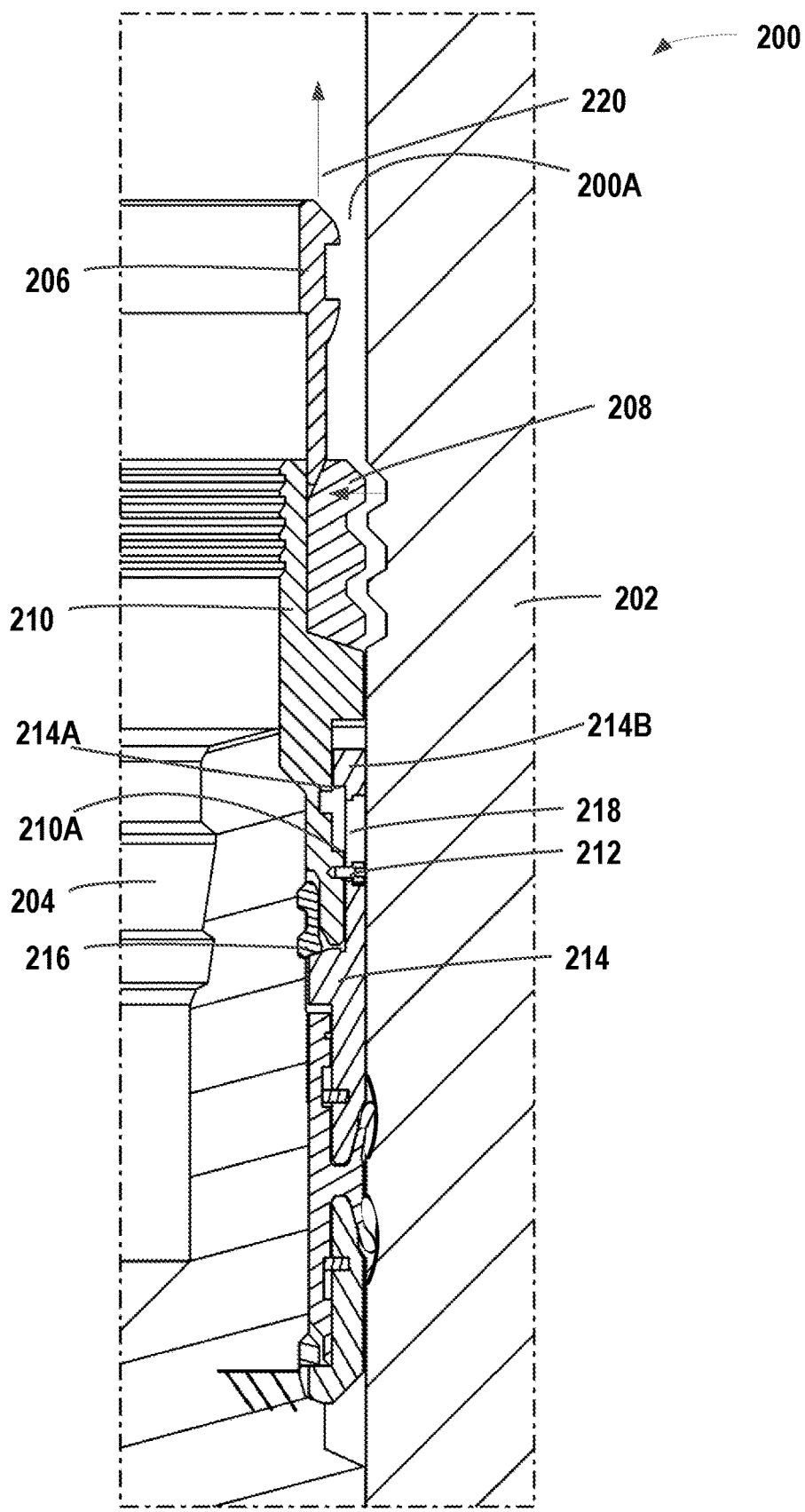
FIG. 2 illustrates a cross-sectional view of a wellhead annulus packoff in a first stage of a partly de-energized state, in accordance with at least one embodiment.

FIG. 2 illustrates a cross-sectional view 200 of a wellhead annulus packoff 200A in a first stage of a partly de-energized state, in accordance with at least one embodiment. When a first pulling force 220 is applied to one of the seal components, such as a hanger lockdown energizing ring 206, of the wellhead annulus packoff 200A, an upper (or hanger) lockdown ring 208 is caused to be released from indentations of a housing 202. Also illustrated is an upper energizing ring 210, a middle energizing ring 214, and an anti-rotation pin 212. The anti-rotation pin 212 may not be load bearing and may be provided as an anti-rotation pin to keep seal components aligned circumferentially.

In at least one embodiment, the anti-rotation pin 212 is initially associated with the upper energizing ring 210 in an energized state of the wellhead annulus packoff 200A. The anti-rotation pin 212 travels with the upper energizing ring 210 in the direction of the pulling force. The top surface 210A of the upper energizing ring 210 then contacts a shoulder 214A of a top part 214B of the middle energizing ring 214 (as illustrated by marker 314 in FIG. 3), which causes the middle energizing ring 214 to then move in the direction of the pulling force as in FIG. 3. There may be more than one anti-rotation pin 212 that associates together the upper energizing ring 210 and the middle energizing ring 214.

The upper energizing ring 210 holds in place a middle (or seal) lockdown ring 216 that may be sitting on a shoulder of a middle energizing ring 214. In at least one embodiment, the middle lockdown ring 216 may be radially supported by the lower portion of the upper energizing ring 210. When the upper energizing ring 210 is pulled up, it removes such radial support and an outward biasing of the middle lockdown ring 216 causes it to expand outwards. Such outward biasing de-energizes the middle lockdown ring 216 and allows it to be retrieved. Each lockdown ring and energizing ring pair may be a stage of a multi-stage MS seal.

Figure 3:
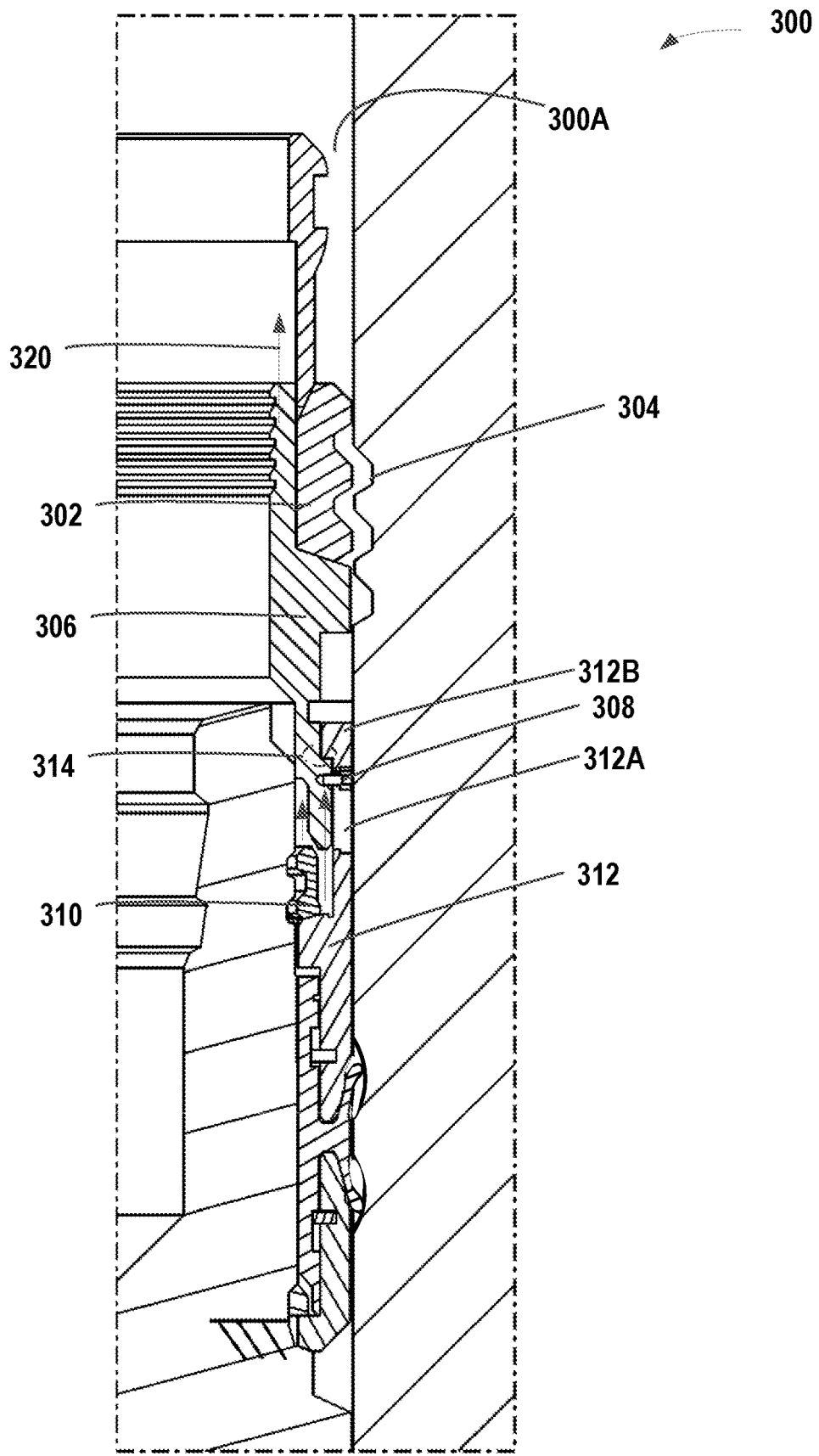
FIG. 3 illustrates a cross-sectional view of a wellhead annulus packoff in a second stage of a partly de-energized state, in accordance with at least one embodiment.

FIG. 3 illustrates a cross-sectional view 300 of a wellhead annulus packoff 300A in a second stage of a partly de-energized state, in accordance with at least one embodiment. Partly as a result of the first pulling force, the upper lockdown ring 302 releases and advances, relative to the indentations 304 of the housing. A second pulling force 320 may be applied, in the second stage, to the upper energizing ring 306. As noted in the description with respect to FIG. 2, a top surface of the upper energizing ring 306 is illustrated, as in marker 314, as contacting a shoulder of a top part 312B of the middle energizing ring 312 as a result of the second pulling force 320.

Figure 4:
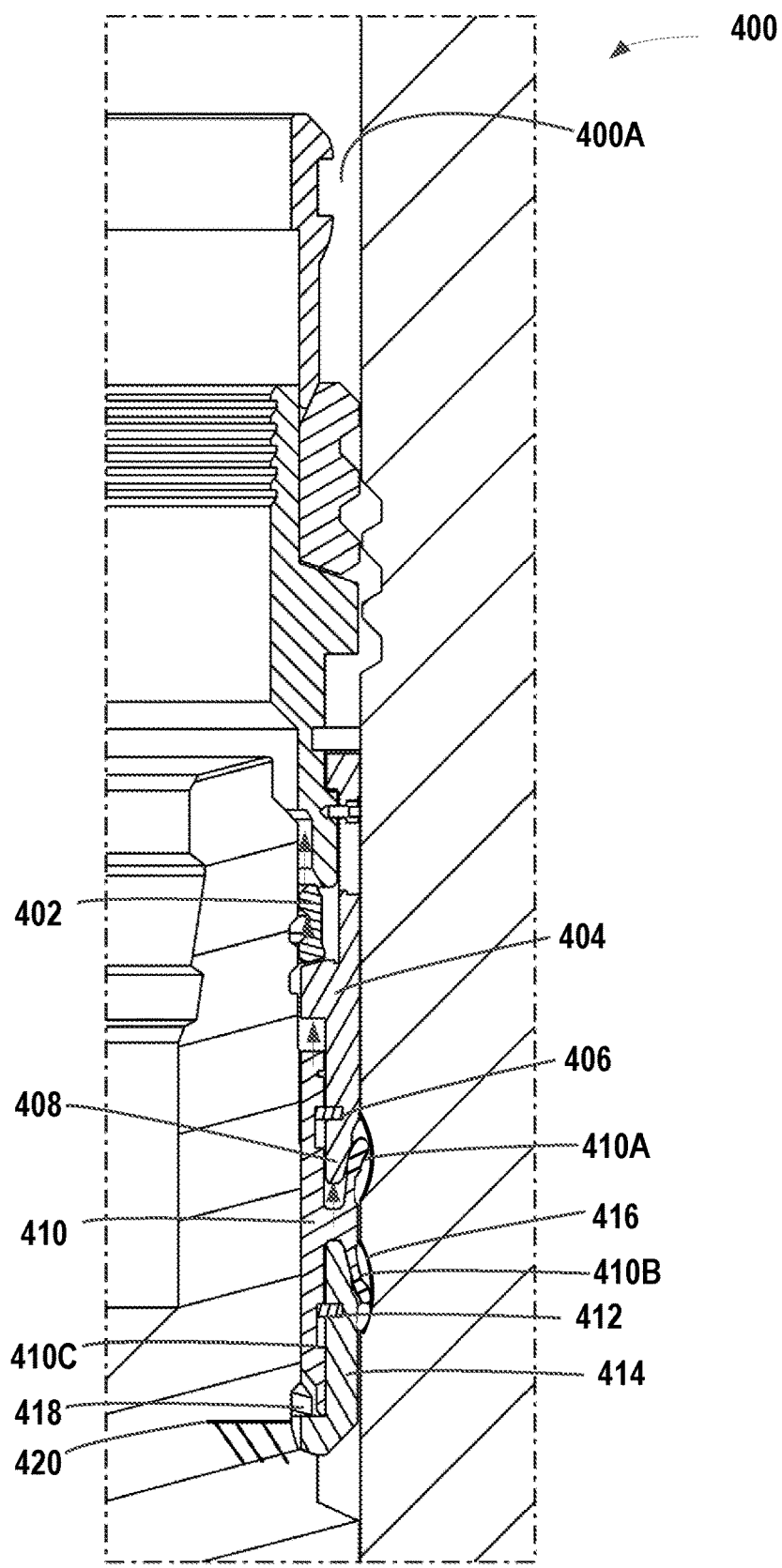
FIG. 4 illustrates a cross-sectional view of a wellhead annulus packoff in a third stage of a partly de-energized state, in accordance with at least one embodiment.

The anti-rotation pin 308 is allowed to travel through a slot or spacing 312A of the middle energizing ring 312. The middle energizing ring 312 is also pulled out as a result of the the surface-to-shoulder contact in marker 314, as the de-energizing operation continues for the wellhead annulus packoff 300A, the full effect of which is illustrated in FIG. 4. Also illustrated in FIG. 3 is that the upper energizing ring 306 has fully cleared a middle lockdown ring 310 that releases out of indentations in the hanger. Pertinently, the middle lock down ring 310 is outwards biased, and moves outwards relative to an axis of the wellbore. The outwards bias is further enabled as radial support previously provided by the upper energizing ring 306 is removed. As the middle lockdown ring 310 sits on a shoulder of the middle energizing ring 312, it is also moved out in the direction of the pulling force.

FIG. 4 illustrates a cross-sectional view 400 of a wellhead annulus packoff 400A in a third stage of a partly de-energized state, in accordance with at least one embodiment. As the pulling force is continued, the middle lockdown ring 402 moves in the direction of the pulling force assisted by the middle energizing ring 404. Further, a transfer mechanism 406, such as a retention ring, associates the middle energizing ring 404 with the seal element 410. In at least one embodiment, the transfer mechanism 406 may be a solid ring, a split ring, or a segmented ring. In at least one embodiment, the transfer mechanism 406 is a ring having segments. Allowances may be made by such a transfer mechanism 406 for the middle energizing ring 404 to transfer pulling force to the seal element 410 in a similar manner as the surface-shoulder interaction described in marker 314 of FIG. 3. As a bottom portion 408 of the middle energizing ring 404 vacates a top slot of the seal element 410, a first side 410A of the seal element that was previously abutting an indentation or pocket 416 of the housing is released as further illustrated in FIG. 5, and which supports de-energizing of the upper seal.

In the absence of the retainer lock mechanism 418, an elevation of the wellhead annulus packoff 400A, because of the pulling force, is such that the second side 410B of the seal element 410 that was previously abutting the indentation or pocket 416 of the housing may be pulled into a tapered transition of the lower indentation or pocket 416 of the housing and the wellhead bore. Such a pulling action may result in pinching of a lower seal having the seal element 410, where such pinching is against the pocket or indentation 416 and may result in increased pulling force required to remove the wellhead annulus packoff 400A because of at least additional friction and interference caused. The retainer lock mechanism 418 at least maintains an elevation of the lower energizing ring 414 so that the wellhead annulus packoff 400A can be pulled out without such increased pulling force.

Figure 5:
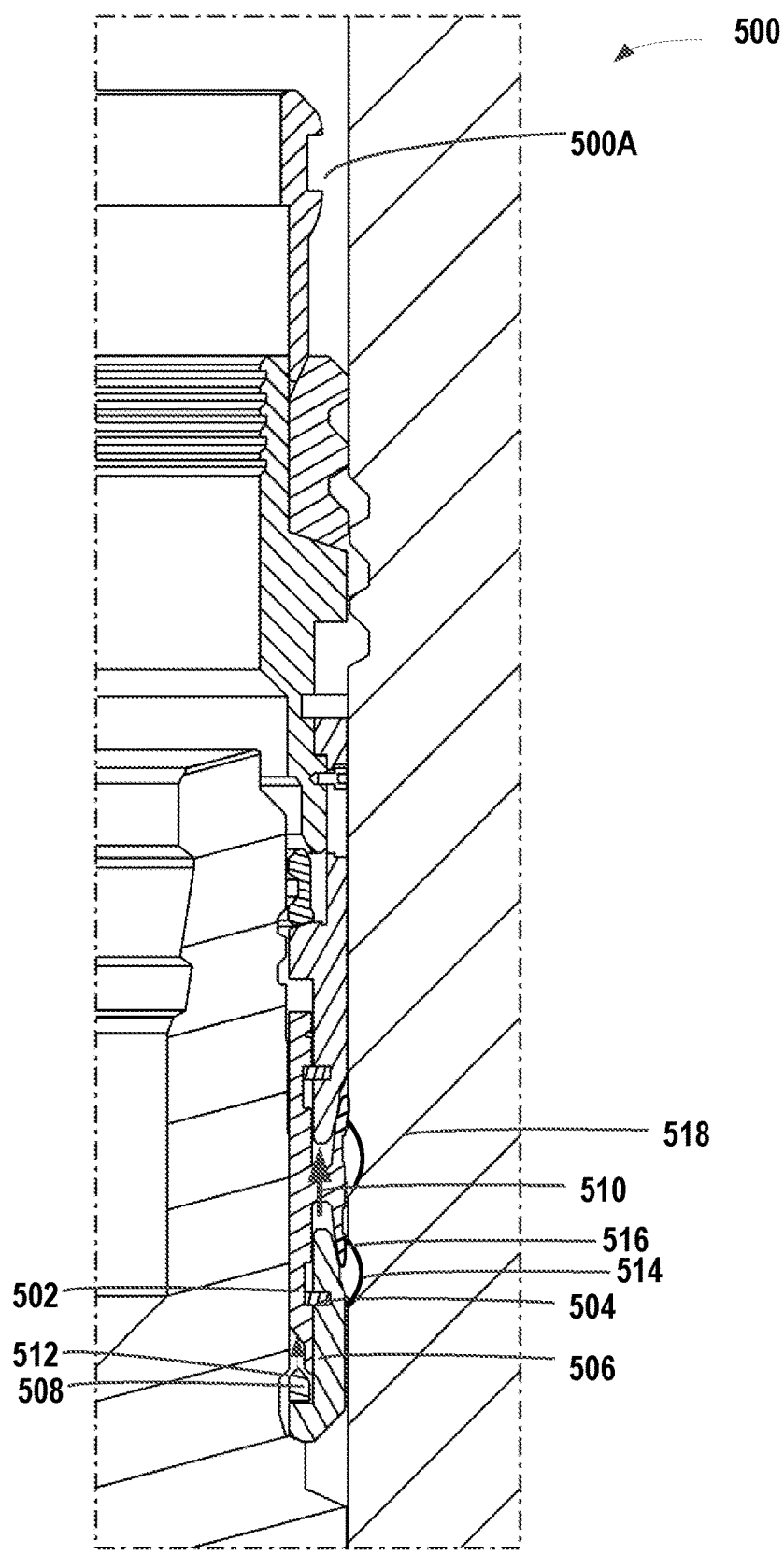
FIG. 5 illustrates a cross-sectional view of a wellhead annulus packoff in a fully de-energized state, in accordance with at least one embodiment.

Also illustrated in FIG. 4 is further transfer mechanism 412 and a lower energizing ring 414, a seal element 410 that has legs 410A, 410B and a shoulder 410C, which is illustrated in FIG. 5. The pulling force is transferred to the lower energizing ring 414. The transfer mechanism 412 may represent a solid ring, a split ring, or a segmented ring that is associated with one or more of the seal element 410 and the lower energizing ring 414. The transfer mechanism 412 supports the lower energizing ring 414 as it is being de-energized with the seal element 410 being pulled out. The lower energizing ring 414 and the retainer lock mechanism 418 can enable the second side of the seal element to move from the at least one second indentation of the housing. In FIG. 4, an illustrative fixed boundary condition 420 (also in FIGS. 1, 2, and 3) is provided to represent an elevation or anchoring point for the lower energizing ring 414, due to an engagement of the retainer lock mechanism 418 with the hanger, until it is released.

FIG. 5 illustrates a cross-sectional view 500 of a wellhead annulus packoff 500A in a fully de-energized state, in accordance with at least one embodiment. As the pulling force 510 transfers to the lower seal components of the multi-stage MS seal, the seal element 502 releases from between the retainer lock mechanism 508 and the lower energizing ring 506. The retainer lock mechanism 508, being outwards biased, moves outwards relative to an axis passing longitudinally through a wellbore as a radial support previously provided by the lower leg 516 of the seal element 502 clears the surface 514 of the housing. With the lower leg 516 of the seal element 502 fully de-energized and the retainer lock mechanism 508 retracted, the wellhead annulus packoff 500A can now be completely recovered, as further illustrated in FIG. 6.

Figure 6:
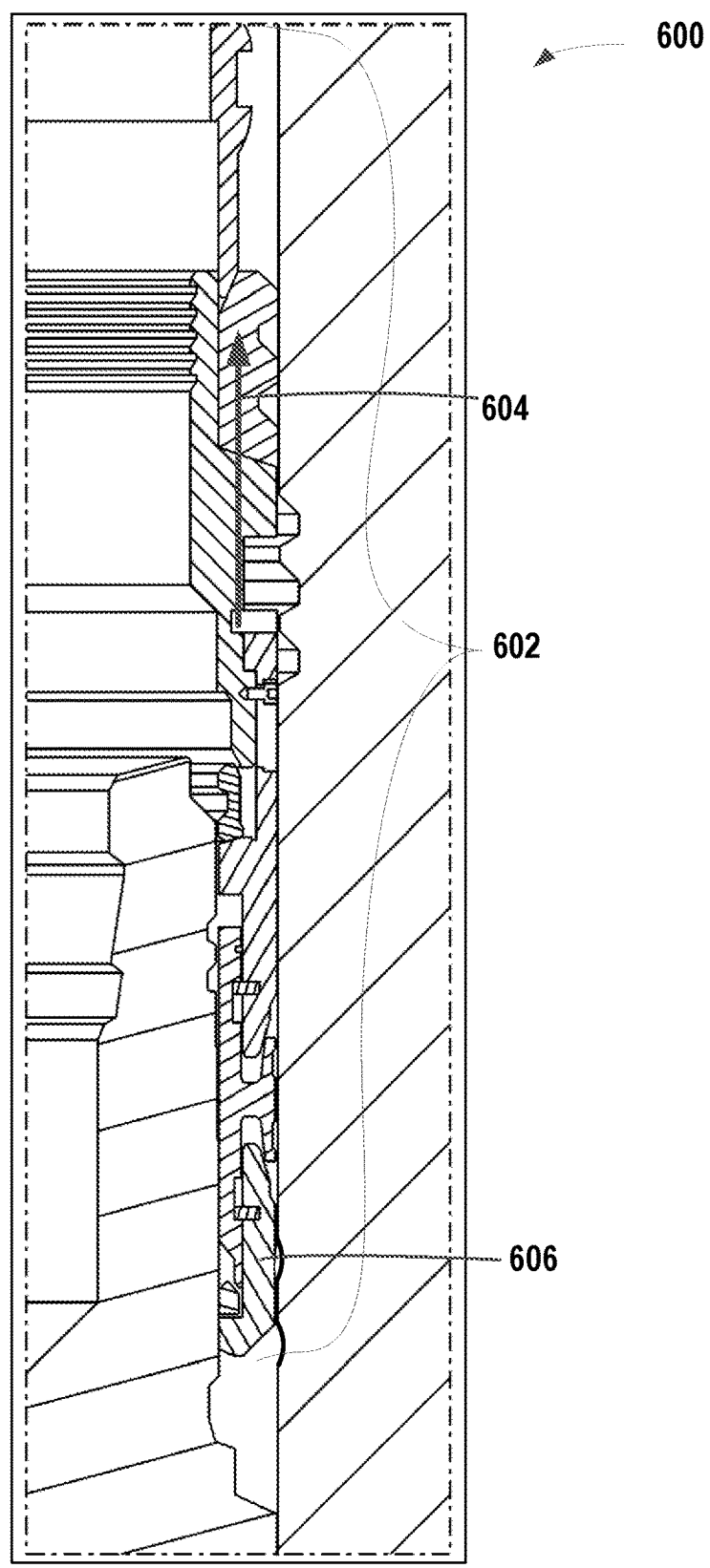
FIG. 6 illustrates a cross-sectional view of a wellhead annulus packoff in a further fully de-energized state, in accordance with at least one embodiment.

FIG. 6 illustrates a cross-sectional view 600 of a wellhead annulus packoff 602 in a further fully de-energized state, in accordance with at least one embodiment. FIG. 6 also illustrates that, as the pulling force 604 is continued, the wellhead annulus packoff 602 is removed with the lower energizing ring 606 at the bottom and without further pinching of the surfaces of at least the seal element against the housing.

Figure 7:
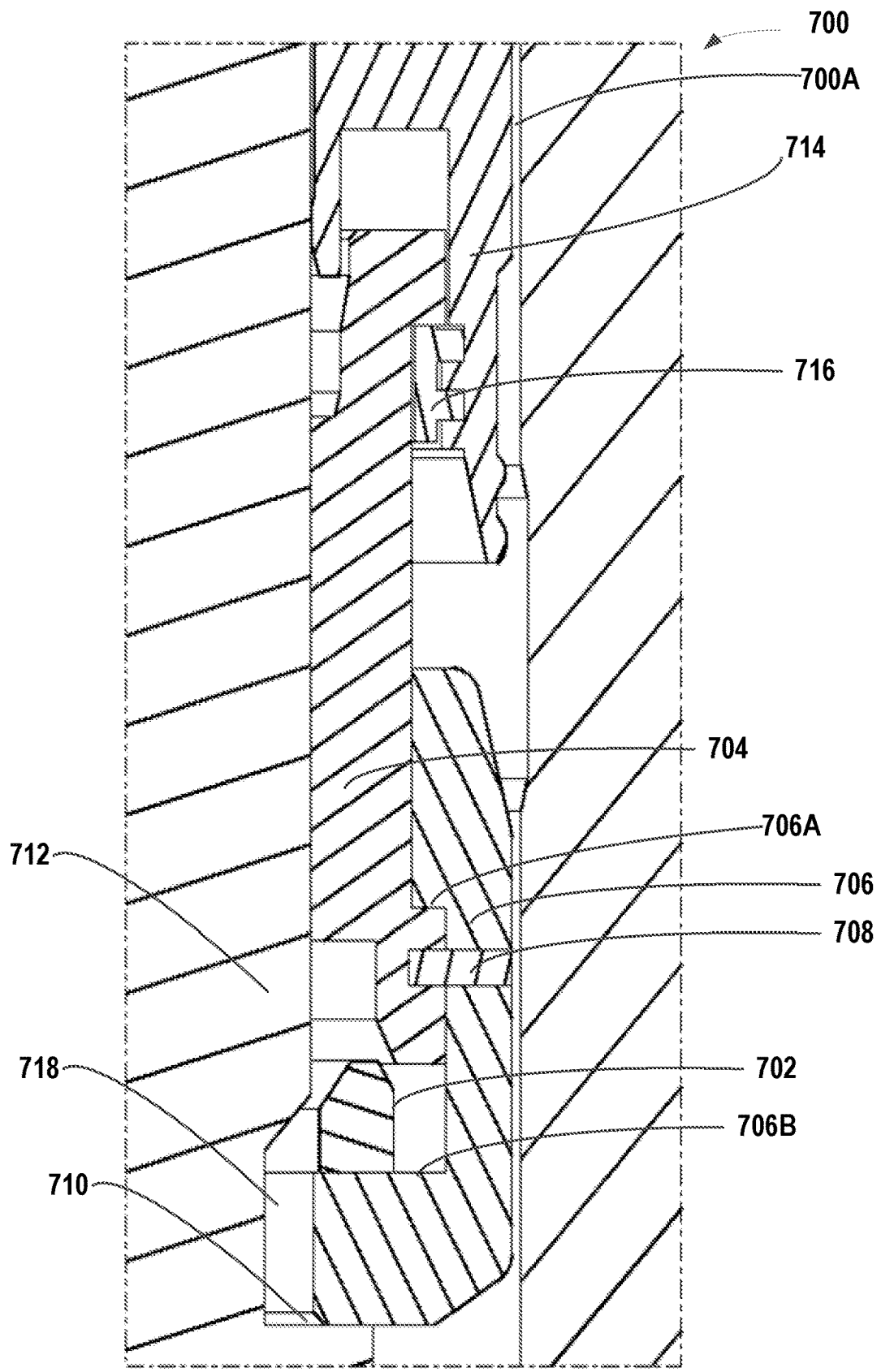
FIG. 7 illustrates a cross-sectional view of a part of a wellhead annulus packoff in a landed state, in accordance with at least one embodiment.

FIG. 7 illustrates a cross-sectional view 700 of a part of a wellhead annulus packoff 700A in a landed state, in accordance with at least one embodiment. FIG. 7 also illustrates a different association between a second middle energizing ring 704, the seal element 714, and the lower energizing ring 706, in at least one embodiment. Other than a transfer mechanism, such as a retention ring, the lower energizing ring 706 may have a top shoulder 706A and a bottom surface 706B. A shear pin 708, along with the top shoulder 706A, provides association between the lower energizing ring 706 and the second middle energizing ring 704.

In at least one embodiment, other mechanical conditional operators adapted to disengage during energizing, than a shear pin, may be used. These may include mechanical conditional operators that disengage under tensile stress or spring-loaded mechanical conditional operators. Disengagement in reference to a shear pin is when the shear pin shears, in reference to a tensile stress is when a mechanical conditional operator collapses, compresses, or tenses, and in reference to a spring-loaded mechanical conditional operator is when the spring becomes tensed. Further, is a buckling member or a ring may be used where such members collapses, compresses, or tenses at a determined energizing force, A transfer mechanism 716 (such as, described in FIG. 9A) may be used to support the multiple stages of the wellhead annulus packoff 700A during running operations into the wellhead annulus. Such a transfer mechanism 716 may also be used to transfer a pulling forces associated with de-energizing of the wellhead annulus packoff 700A. FIG. 7 also illustrates, in at least one embodiment, that the lower energizing ring 706 is landed on a shoulder 710 of the hanger 712 with the assistance of the transfer mechanism 716, the shear pin 708, and the top shoulder 706A. The indentation 718 of the hanger is ready to receive the retainer lock mechanism 702 that rests on the bottom surface 706B of the lower energizing ring 706.

Figure 8:
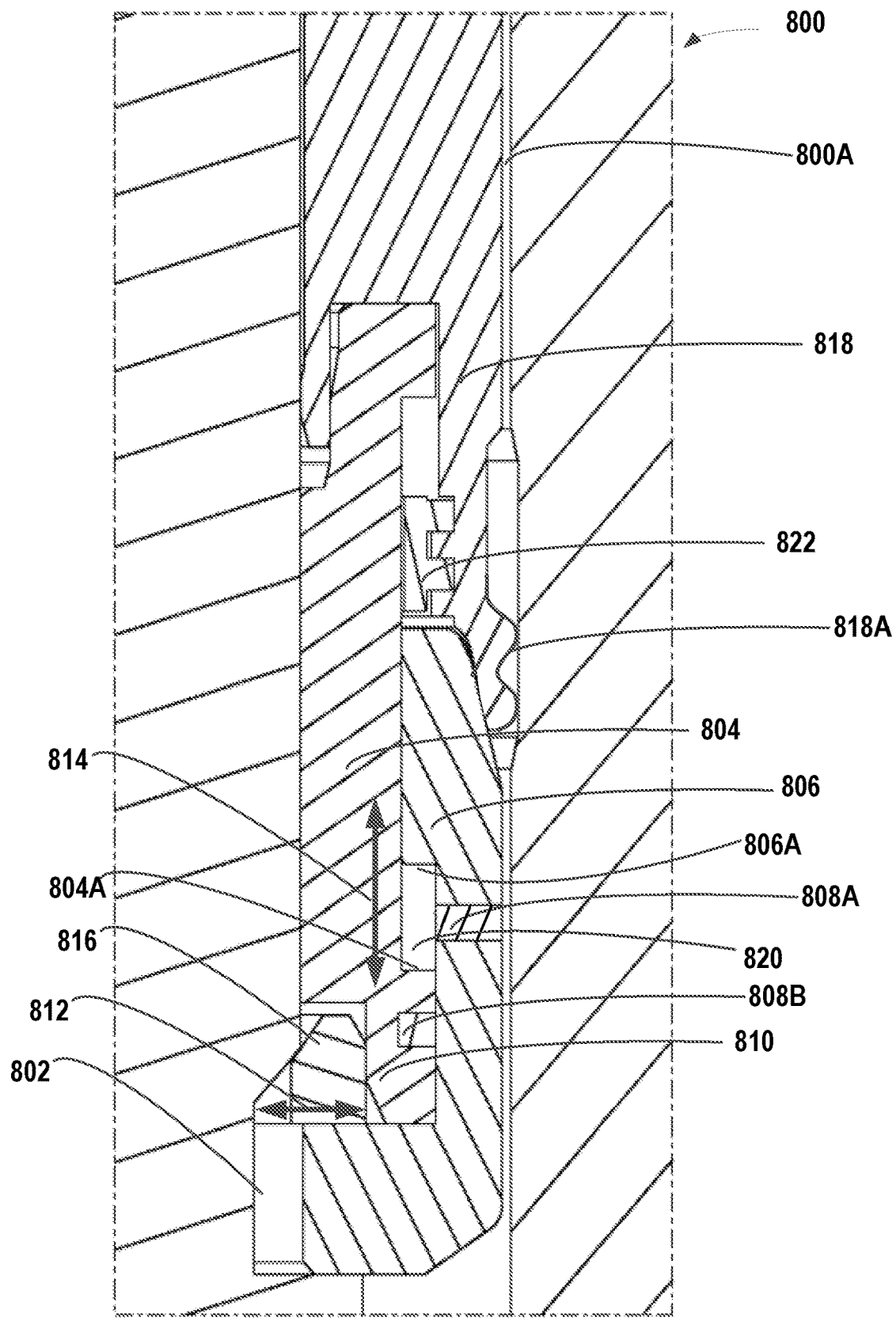
FIG. 8 illustrates a cross-sectional view of a part of a wellhead annulus packoff in an energizing or energized state, in accordance with at least one embodiment.

FIG. 8 illustrates a cross-sectional view 800 of a part of a wellhead annulus packoff 800A in an energizing or energized state, in accordance with at least one embodiment. The seal element 818 is energized by an energizing force 814 (referenced by the downward arrow of the double-sided arrow 814) transferred from upper seal components of the multi-stage MS seal. The energizing force 814 causes the seal element 818 to push, in the direction of the energizing force, against the second middle energizing ring 804. The second middle energizing ring 804 moves in the same direction and causes the shear pin 808A to shear into parts 808A, 808B. With the shear pin sheared, the second middle energizing ring 804 causes the retainer lock mechanism 816 to move 812 into an indentation or pocket 802 of the hanger. The second middle energizing ring 804 abuts the retainer lock mechanism 816 on one side and abuts the lower energizing ring 806 on another side.

For removal, de-energizing starts with a pulling force (referenced by upward arrow of the double-sided arrow 814) that eventually reaches the second middle energizing ring 804. For example, the seal element 818 is pulled up and causes an association of the transfer mechanism 822 with the second middle energizing ring 804. In turn, a top shoulder of the lower energizing ring 806 catches a shoulder of the second middle energizing ring 804, as referenced in FIG. 7 and illustrated also in FIG. 8. However, prior to this association of shoulders, a space 820 caused by the shearing of the shear pins allows movement of the second middle energizing ring 804 so that the retainer lock mechanism 816 is de-energized and can be released from the indentation or pocket 802.

In at least one embodiment, one or more shoulders 804A, 808A may represent a surface associated with the lower energizing ring 806. The one or more shoulders 804A, 808A can enable the lower energizing ring 806 to be de-energized with the seal element being pulled out. The lower energizing ring 806 and the retainer lock mechanism 816 can enable a second side of the seal element 818 to move from the at least one indentation of the housing.

With the seal element fully de-energized and the release of the retainer lock mechanism 816, the wellhead annulus packoff 800A may be removed, in alignment, with the lower seal components resting on the lower energizing ring 806. As such, there will be no pinching of an opposite surface of the seal element, because the seal element is fully de-energized and prevented from applying pressure against the sides (such as, a side 818A) of the seal element 818. Such pressure would have caused the sides 818A of the seal element 818 to rub against the housing or pinch against a pocket or indentation of the housing.

In at least one embodiment, FIGS. 1 and 5 and FIGS. 7 and 8 illustrates energized and de-energized states of a wellhead annulus packoff. These Figures also illustrate the use of a retainer lock mechanism in a binary capability. As part of this binary capability, the retainer lock mechanism can be in an engaged position between the hanger, the seal element, the lower energizing ring, with the wellhead annulus packoff in the energized state; and can be in a disengaged position with the wellhead annulus packoff in a de-energized state.

Figure 9A:
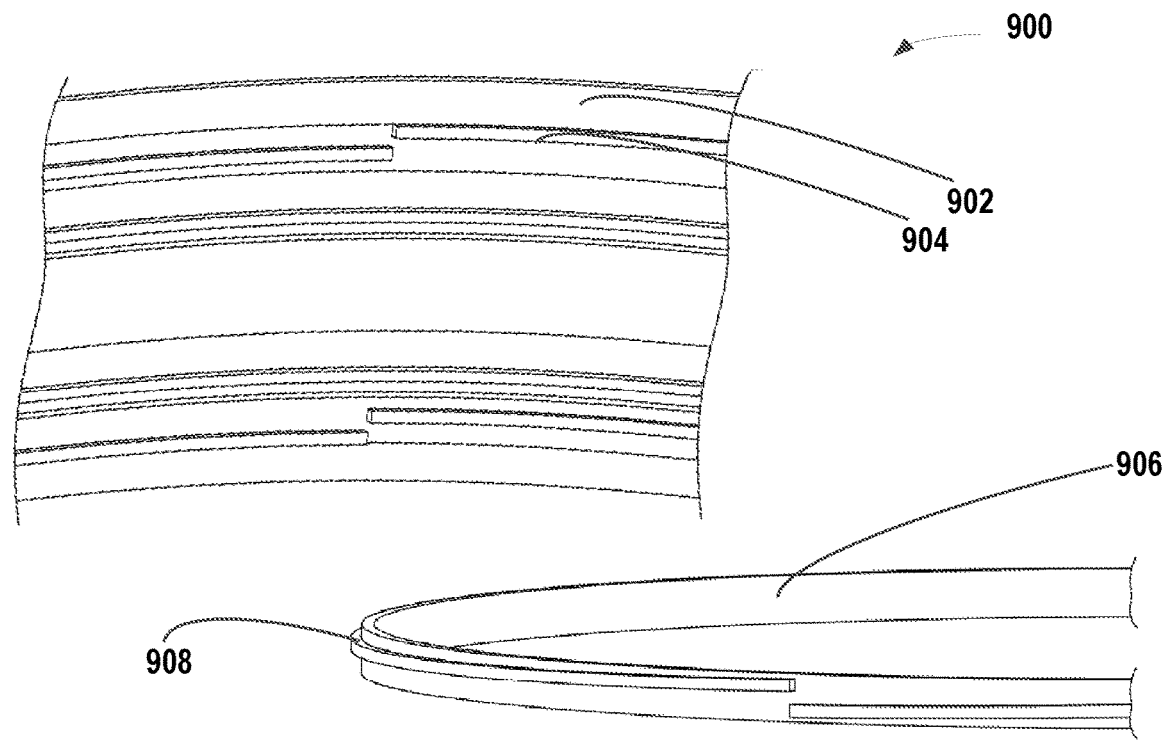
FIGS. 9A and 9B illustrate perspective views of parts of a wellhead annulus packoff to be engaged together, in accordance with at least one embodiment.
Figure 9B:
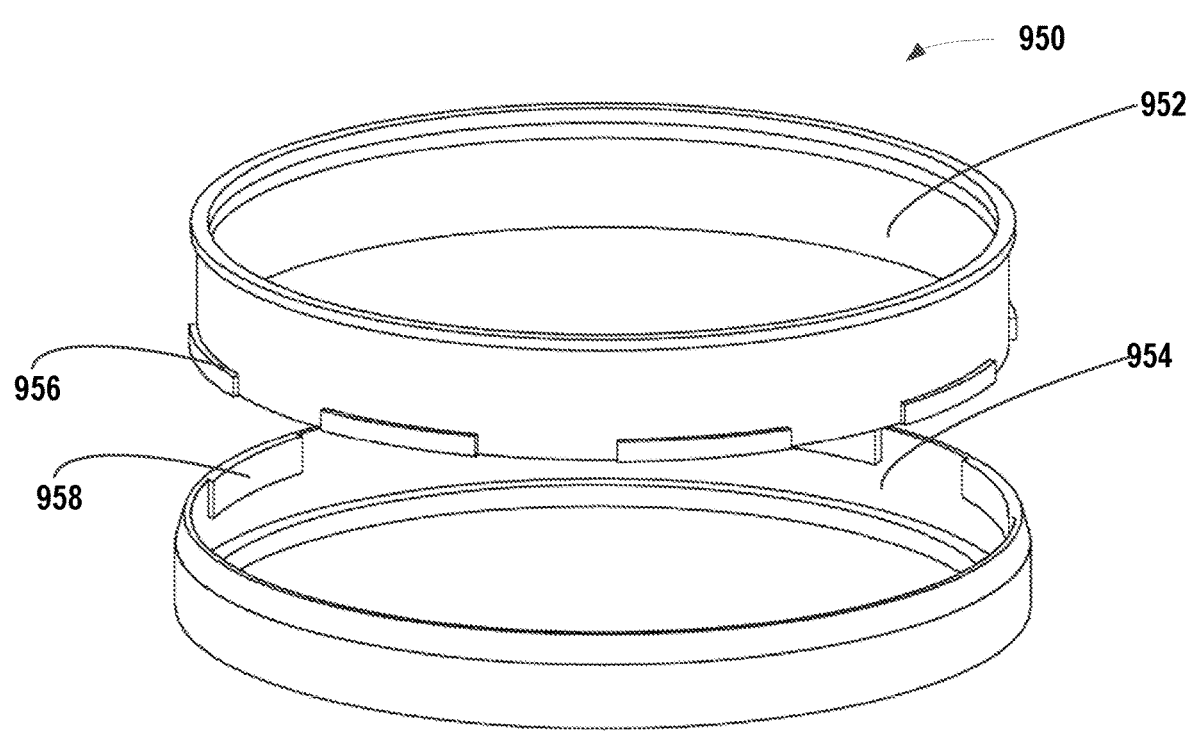

FIGS. 9A and 9B illustrate perspective views 900, 950 of parts of a wellhead annulus packoff to be engaged together, in accordance with at least one embodiment. For example, the perspective view 900 illustrates features of a transfer mechanism 906 to be associated with part 902 of a seal element or other energizing ring that forms the wellhead annulus packoff. There may be square mating threads 904, 908 to associate the transfer mechanism 906 with part 902 of the seal element or other energizing ring.

A perspective view 950 of a J-slot or a breech-lock between a second middle energizing ring 952 and a lower energizing ring 954 is illustrated in FIG. 9B. The J-slot supports a space, such as referenced in FIG. 8, caused during energizing, by the shearing of the shear pins, which then allows movement of the second middle energizing ring. This space subsequently allows the retainer lock mechanism to be de-energized and to be released from an indentation or pocket of a wellhead annulus. For example, the perspective view 950 illustrates features 956 of the second middle energizing ring 952 to allow association with features 958 of the lower energizing ring 954. Those features 956, 958 may be flanges that allow the second middle energizing ring 952 to fit inside the lower energizing ring 954 and to allow the second middle energizing ring 952 to move relative to a lower energizing ring 954.

Figure 10:
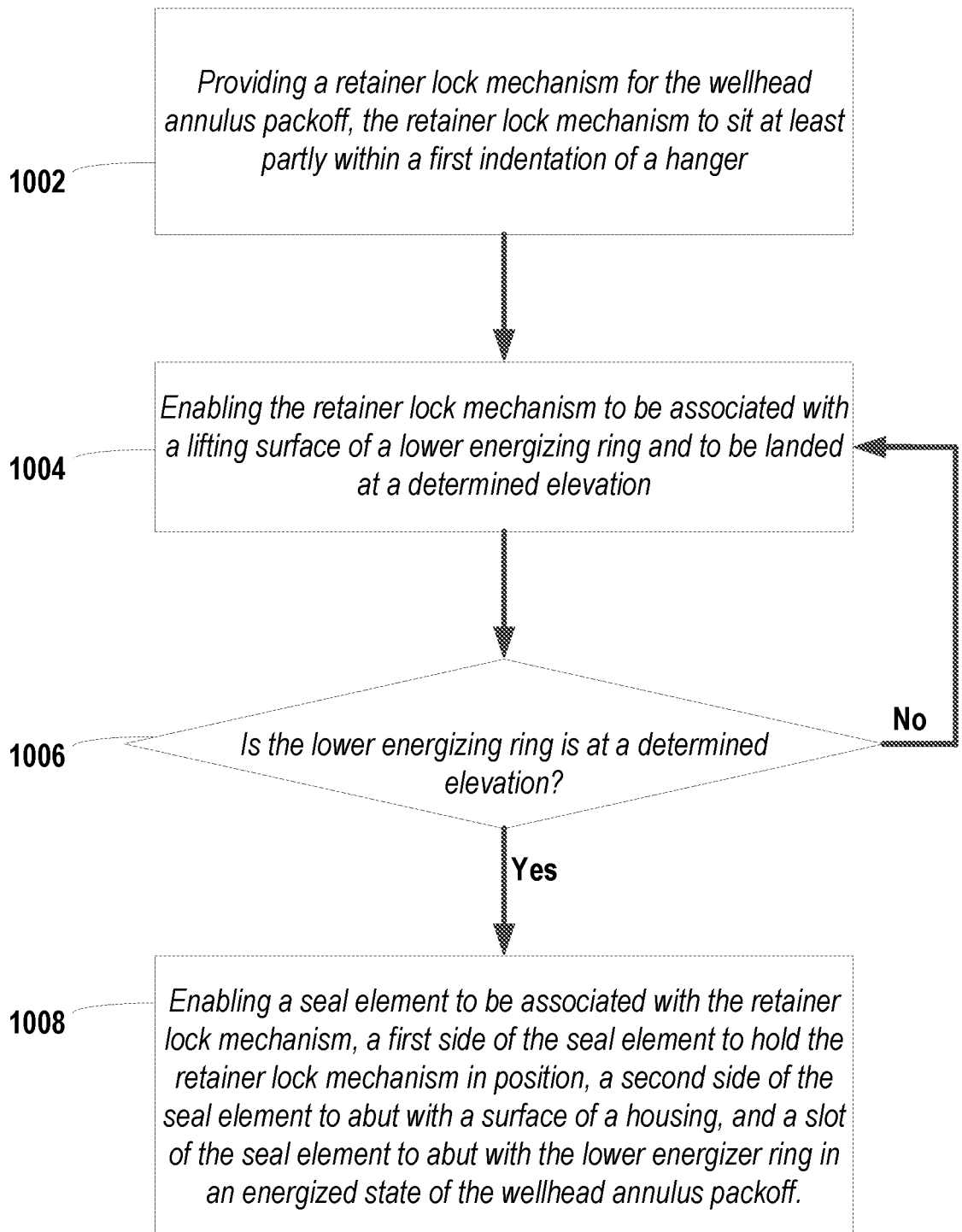
FIG. 10 is a flowchart illustrating a method for a wellhead annulus packoff, in accordance with at least one embodiment.

FIG. 10 is a flowchart illustrating a method 1000 for a wellhead annulus packoff, in accordance with at least one embodiment. The method includes providing (1002) a retainer lock mechanism for the wellhead annulus packoff. The retainer lock mechanism is adapted to sit at least partly within a first indentation of a hanger. The method includes enabling (1004) the retainer lock mechanism to be associated with a lifting surface of a lower energizing ring and to be landed in at a determined elevation within an annular space that is to include the wellhead annulus packoff. A further step (1006) in the method includes verification that the lower energizing ring is at a determined position. In at least one embodiment, such a step 1006 may be enabled by a determined shape and positioning of a retainer lock mechanism.

Step 1004 may be repeated till the lower energizing ring is at a determined position or step 1008 may be otherwise performed. The method includes a step for enabling (1008)

a seal element to be associated with the retainer lock mechanism. A first side of the seal element can hold the retainer lock mechanism in position. A second side of the seal element can abut with a surface of a housing. Further, a slot of the seal element can abut with the lower energizing ring in an energized state of the wellhead annulus packoff. These features of the seal element may be part of the associating (1008) step.

The method 1000 may include a step or a sub-step for enabling a binary capability of the retainer lock mechanism. The retainer lock mechanism can be in an engaged position between the hanger, the seal element, the lower energizing ring with the wellhead annulus packoff in an energized state. Further, as part of the binary capability, the retainer lock mechanism can be in a disengaged position with the wellhead annulus packoff in a de-energized state. The method 1000 may include a step or a sub-step for providing the surface of the housing to be recessed within the housing.

The method 1000 may include a step or a sub-step for associating a transfer mechanism or retention ring with one or more of the seal element and the lower energizing ring. The transfer mechanism or retention ring to enable the lower energizing ring to be de-energized with the seal element being pulled out. The lower energizing ring and the retainer lock mechanism to enable the second side of the seal element to move from the at least one second indentation of the housing.

The method 1000 may include a step or a sub-step for associating a transfer mechanism or retention ring between the seal element and the lower energizing ring. A transfer mechanism or retention ring can enable the lower energizing ring and the seal element to move vertically from the at least one second indentation. The method 1000 may include a step or a sub-step for enabling a transfer mechanism or retention ring to be associated between the seal element and the lower energizing ring. The transfer mechanism or retention ring can allow landing of the lower energizing ring and the retainer lock mechanism into an annular space between the hanger and the housing.

The method 1000 may include a step or a sub-step for enabling at least one inclined top surface of the retainer lock mechanism to: allow the retainer lock mechanism to be disengaged from the first indentation of the hanger during de-energizing of the wellhead annulus packoff; allow the retainer lock mechanism to engage the first indentation of the hanger during energizing of the wellhead annulus packoff; or transfer a vertical upwards force from the lower energizing ring into a neck of the hanger in an energized state of the wellhead annulus packoff.

The method 1000 may include a step or a sub-step for providing a bottom surface of the retainer lock mechanism to abut the lifting surface of the lower energizing ring. The bottom surface and a side surface of the retainer lock mechanism can limit a top surface of the lower energizing ring or the second side of the seal element from asserting pressure against the housing during de-energizing of the wellhead annulus packoff.

The method 1000 may include a step or a sub-step for enabling the wellhead annulus packoff to be removed with a first de-energizing force or forces that is less than a second de-energizing force or forces. The second de-energizing force or forces may be associated with a version of the wellhead annulus packoff that is devoid of the retainer lock mechanism.

The method 1000 may include a step or a sub-step for providing one or more surfaces of the retainer lock mechanism to enable a determined elevation of the lower energizing ring. The method 1000 may include a step or a sub-step for providing multiple seal stages above the retainer lock mechanism. The multiple seal stages may be associated with each other and with the seal element via one or more transfer mechanisms, retention rings, or surfaces. The one or more transfer mechanisms, retention rings, or surfaces can enable the retainer lock mechanism to be removed with the multiple seal stages during de-energizing of the wellhead annulus packoff.

It should be appreciated that embodiments herein may utilize one or more values that may be experimentally determined or correlated to certain performance characteristics based on operating conditions under similar or different conditions. The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art and are intended to be encompassed within the spirit of the present disclosure disclosed herein and the scope of the appended claims.

While techniques herein may be subject to modifications and alternative constructions, these variations are within spirit of present disclosure. As such, certain illustrated embodiments are shown in drawings and have been described above in detail, but these are not limiting disclosure to specific form or forms disclosed; and instead, cover all modifications, alternative constructions, and equivalents falling within spirit and scope of disclosure, as defined in appended claims.

Terms such as a, an, the, and similar referents, in context of describing disclosed embodiments (especially in context of following claims), are understood to cover both singular and plural, unless otherwise indicated herein or clearly contradicted by context, and not as a definition of a term. Including, having, including, and containing are understood to be open-ended terms (meaning a phrase such as, including, but not limited to) unless otherwise noted. Connected, when unmodified and referring to physical connections, may be understood as partly or wholly contained within, attached to, or joined together, even if there is something intervening.

Recitation of ranges of values herein are merely intended to serve as a shorthand method of referring individually to each separate value falling within range, unless otherwise indicated herein and each separate value is incorporated into specification as if it were individually recited herein. In at least one embodiment, use of a term, such as a set (for a set of items) or subset unless otherwise noted or contradicted by context, is understood to be nonempty collection including one or more members. Further, unless otherwise noted or contradicted by context, term subset of a corresponding set does not necessarily denote a proper subset of corresponding set, but subset and corresponding set may be equal.

Conjunctive language, such as phrases of form, at least one of A, B, and C, or at least one of A, B and C, unless specifically stated otherwise or otherwise clearly contradicted by context, is otherwise understood with context as used in general to present that an item, term, etc., may be either A or B or C, or any nonempty subset of set of A and B and C. In at least one embodiment of a set having three members, conjunctive phrases, such as at least one of A, B, and C and at least one of A, B and C refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, terms such as plurality, indicates a state of being plural (such as, a plurality of items indicates multiple items). In at least one embodiment, a number of items in a plurality is at least two, but can be more when so indicated either explicitly or by context. Further, unless stated otherwise or otherwise clear from context, phrases such as based on means based at least in part on and not based solely on.

In at least one embodiment, even though the above discussion provides at least one embodiment having implementations of described techniques, other architectures may be used to implement described functionality, and are intended to be within scope of this disclosure. In addition, although specific responsibilities may be distributed to components and processes, they are defined above for purposes of discussion, and various functions and responsibilities might be distributed and divided in different ways, depending on circumstances.

In at least one embodiment, although subject matter has been described in language specific to structures and/or methods or processes, it is to be understood that subject matter claimed in appended claims is not limited to specific structures or methods described. Instead, specific structures or methods are disclosed as example forms of how a claim may be implemented.

From all the above, a person of ordinary skill would readily understand that the tool of the present disclosure provides numerous technical and commercial advantages, and can be used in a variety of applications. Various embodiments may be combined or modified based in part on the present disclosure, which is readily understood to support such combination and modifications to achieve the benefits described above.

What is claimed is:

1. A method for a wellhead annulus packoff, comprising:
providing a retainer lock mechanism for the wellhead annulus packoff, the retainer lock mechanism to sit at least partly within an indentation of a hanger;
enabling the retainer lock mechanism to be associated with a lifting surface of a lower energizing ring; and
enabling a seal element to be associated with the retainer lock mechanism, a first side of the seal element to hold the retainer lock mechanism in position, a second side of the seal element comprising at least one leg to abut within at least one recess of a surface of a housing, and a slot of the seal element to abut with the lower energizing ring in an energized state of the wellhead annulus packoff.

2. The method of claim 1, further comprising:
enabling a binary capability of the retainer lock mechanism, wherein the retainer lock mechanism is to be in an engaged position between the hanger, the seal element, the lower energizing ring, with the wellhead annulus packoff in the energized state, and wherein the retainer lock mechanism is to be in a disengaged position with the wellhead annulus packoff in a de-energized state.

3. The method of claim 1, further comprising:
providing the surface of the housing with two recesses, wherein the seal element comprises two legs, and wherein individual ones of the two legs is to be recessed within individual ones of the two recesses of the housing.

4. The method of claim 1, further comprising:
associating a mechanical conditional operator between the seal element and the lower energizing ring, the mechanical conditional operator to disengage during energizing of the wellhead annulus packoff.

5. The method of claim 1, further comprising:
enabling a surface to be associated between the seal element and the lower energizing ring, the surface to allow landing of the lower energizing ring and the retainer lock mechanism into an annular space between the hanger and the housing.

6. The method of claim 1, further comprising:
enabling at least one inclined top surface of the retainer lock mechanism to:
allow the retainer lock mechanism to be disengaged from the first indentation of the hanger during de-energizing of the wellhead annulus packoff;
allow the retainer lock mechanism to be engaged with the first indentation of the hanger during energizing of the wellhead annulus packoff; or
transfer a vertical upwards force from the lower energizing ring into a neck of the hanger in the energized state of the wellhead annulus packoff.

7. The method of claim 1, further comprising:
providing a bottom surface of the retainer lock mechanism to abut with the lifting surface of the lower energizing ring, the bottom surface and a side surface of the retainer lock mechanism to limit a top surface of the lower energizing ring or the second side of the seal element from asserting pressure against the housing during de-energizing of the wellhead annulus packoff.

8. The method of claim 1, further comprising:
enabling the wellhead annulus packoff to be removed with a first de-energizing force or forces that is less than a second de-energizing force or forces, the second de-energizing force or forces associated with removal the wellhead annulus packoff in an application comprising the wellhead annulus packoff installed while being devoid of the retainer lock mechanism.

9. The method of claim 1, further comprising:
providing one or more surfaces of the retainer lock mechanism to enable a determined elevation of the seal energizing ring within an annular space comprising the wellhead annulus packoff.

10. The method of claim 1, further comprising:
providing multiple seal stages above the retainer lock mechanism, the multiple seal stages associated with each other and with the seal element via one or more surfaces, the one or more surfaces to enable the retainer lock mechanism to be removed with the multiple seal stages during de-energizing of the wellhead annulus packoff.

11. A wellhead annulus packoff, comprising:
a retainer lock mechanism to sit at least partly within an indentation of a hanger and to comprise a bottom surface and a side surface, the bottom surface of the retainer lock mechanism to be associated with a lower energizing ring and the side surface of the retainer lock mechanism to be engaged with a first side of a seal element in an energized state of the wellhead annulus packoff, wherein a second side of the seal element comprises at least one leg to abut within at least one recess of a surface of a housing and wherein a slot of the seal element is to abut with the lower energizing ring in the energized state of the wellhead annulus packoff.

12. The wellhead annulus packoff of claim 11, further comprising:
a binary capability of the retainer lock mechanism, where the retainer lock mechanism is to be in an engaged position between the hanger, the seal element, the lower energizing ring, with the wellhead annulus packoff in the energized state, and wherein the retainer lock mechanism is to be in a disengaged position with the wellhead annulus packoff in a de-energized state.

13. The wellhead annulus packoff of claim 11, further comprising:
two recesses of the housing and two legs for the seal element, wherein individual ones of the two legs is to be recessed within individual ones of the two recesses of the housing.

14. The wellhead annulus packoff of claim 11, further comprising:
a mechanical conditional operator between the seal element and the lower energizing ring, the mechanical conditional operator to disengage during energizing of the wellhead annulus packoff.

15. The wellhead annulus packoff of claim 11, further comprising:
a surface to be associated between the seal element and the lower energizing ring, the surface to allow landing of the lower energizing ring and the retainer lock mechanism into an annular space between the hanger and the housing.

16. The wellhead annulus packoff of claim 11, further comprising:
at least one inclined top surface of the retainer lock mechanism to enable one or more of:
an allowance for the retainer lock mechanism to disengage from the first indentation of the hanger during de-energizing of the wellhead annulus packoff;
an allowance for the retainer lock mechanism to engage the first indentation of the hanger during energizing of the wellhead annulus packoff; or
a transfer of a vertical upwards force from the lower energizing ring into a neck of the hanger in the energized state of the wellhead annulus packoff.

17. The wellhead annulus packoff of claim 11, further comprising:
the bottom surface of the retainer lock mechanism to abut with a lifting surface of the lower energizing ring, the bottom surface and the side surface of the retainer lock mechanism to limit a top surface of the lower energizing ring or the second side of the seal element from asserting pressure against the housing during de-energizing of the wellhead annulus packoff.

18. The wellhead annulus packoff of claim 11, further comprising:
the wellhead annulus packoff to be removed with a first de-energizing force or forces that is less than a second de-energizing force or forces, the second de-energizing force or forces associated with removal of the wellhead annulus packoff in an application comprising the wellhead annulus packoff installed while being devoid of the retainer lock mechanism.

19. The wellhead annulus packoff of claim 11, further comprising:
one or more surfaces of the retainer lock mechanism to enable a determined elevation of the lower energizing ring within an annular space comprising the wellhead annulus packoff.

20. The wellhead annulus packoff of claim 11, further comprising:
multiple seal stages above the retainer lock mechanism, the multiple seal stages associated with each other and with the seal element via one or more surfaces, the one or more surfaces to enable the retainer lock mechanism to be removed with the multiple seal stages during de-energizing of the wellhead annulus packoff.

* * * * *